GEORGE J. LAUGHMAN
INVENTOR.

GEORGE J. LAUGHMAN
INVENTOR.

ATTORNEY

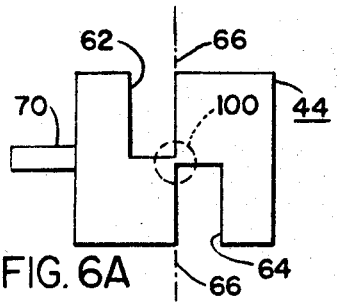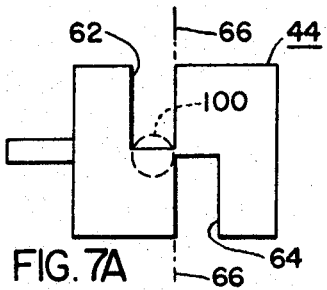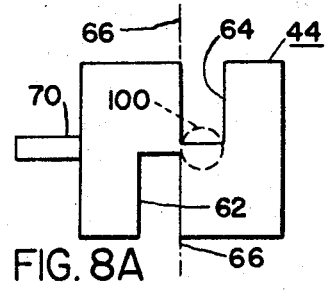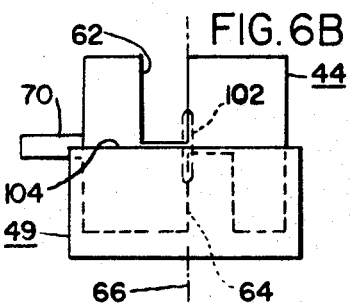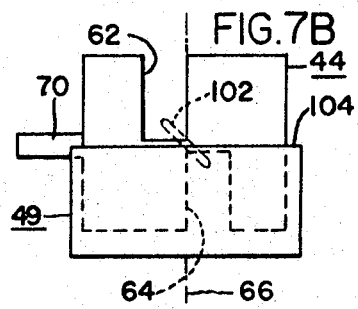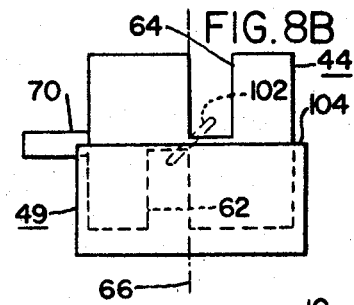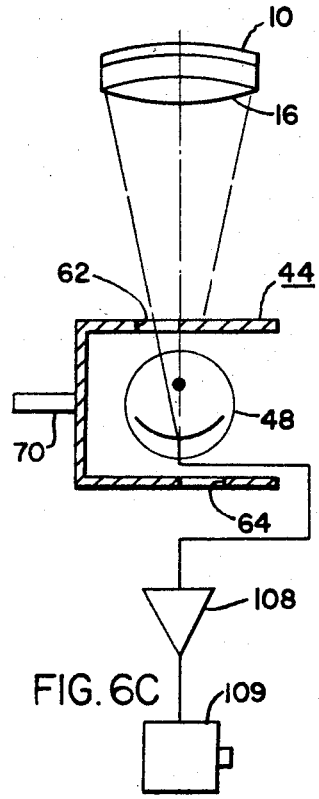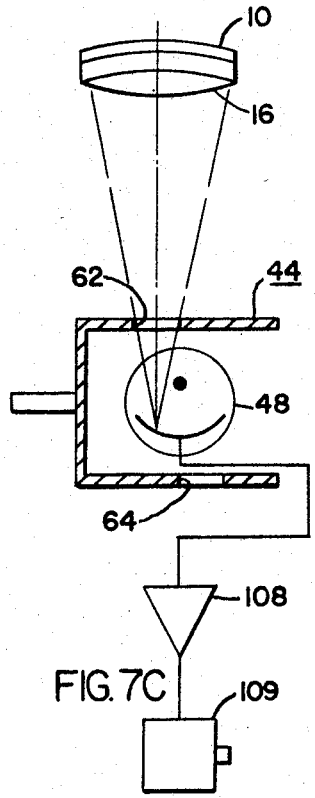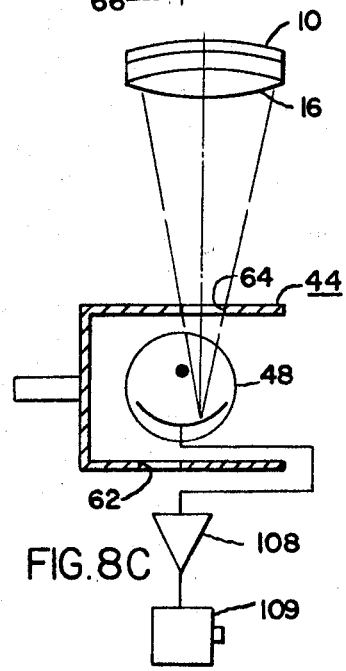

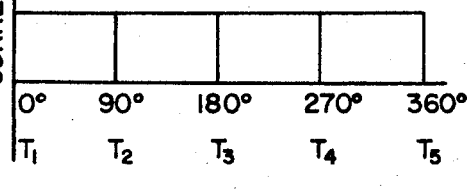
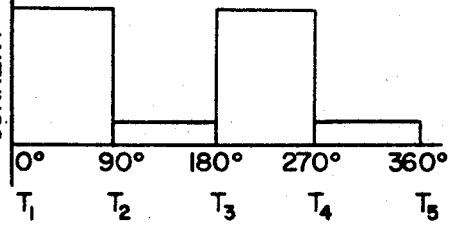
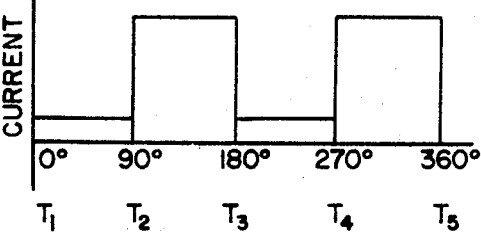
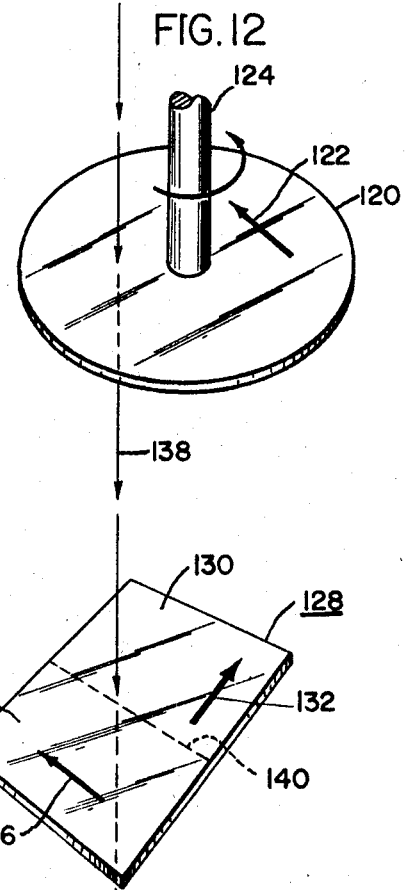
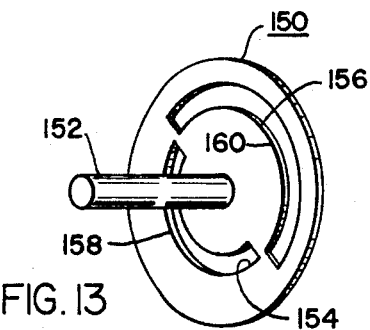
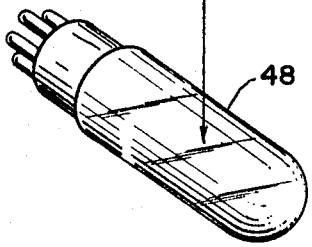
GEORGE J. LAUGHMAN
INVENTOR.
ATTORNEY

United States Patent Office 3,445,665
Patented May 20, 1969

3,445,665
CONTROL SYSTEM FOR AUTOMATICALLY LOCATING THE OPTICAL CENTER AND/OR OPTICAL AXIS OF AN OPTICAL SYSTEM OR LENS
George J. Laughman, Perinton, N.Y., assignor to Bausch & Lomb Incorporated, Rochester, N.Y., a corporation of New York
Filed Oct. 3, 1966, Ser. No. 583,570
Int. Cl. H01j 39/12
U.S. Cl. 250—208                                    9 Claims

ABSTRACT OF THE DISCLOSURE

A control system for automatically positioning an optical system is disclosed. A beam of radiation from the optical system is interrupted by a chopper that provides a limited passage for the beam that periodically alternates about a reference axis. A photodetector receives the chopped beam of radiation and develops an electrical signal that controls a servo motor that drives a portion of the optical system, in a direction transverse the optical axis of the beam to symmetrically position the beam about the chopper reference axis.

---

This invention relates to automatic lens positioning control systems in general, and more particularly to control systems for controlling the light received by a photosensitive device in a manner that is particularly adapted for locating the optical center and/or axes of individual lenses or combination of lenses.

The ophthalmic lenses supplied to opticians etc., by lens manufactures generally comprise circular uncut lenses ground and polished into two main type of lenses, spheric or toric (sphero cylinders), and are available at a wide variety of focal powers. To fill a prescription, the optician merely selects the lens having the correct focal power and shapes the circular uncut contour of the lens to fit the selected ophthalmic frame.

The uncut lens, as it is shipped from the lens manufacturer, is generally marked designating its optical center and optical axis (in the case of toric lenses), and is included in a package designating the focal power and thickness of the lens. The optical center and optical axis (in the case of toric lenses) are designated to provide a reference point and line from which the lens can be properly formed with the desired contoured shape to fit the frame in a manner to provide the desired degree of correction.

Many manually or semi-automatic devices have been developed for determining the focal power, optical center and optical axis of a lens, but have been found to be inefficient for use in modern high-speed lens production systems. This is particularly true in the case of toric lenses wherein the manual systems of the prior art requires separate measurements of the optical center and optical axes as well as two focus readings, one for the spheric axis and another for the combined effect of the spheric axis and the cylindrical axis and interpolation thereof. Any such manual measurements are subject to error due to operator judgement, eye fatigue, etc. For example, the same lens tested twice by a single operator is often measured to have two different set of readings. In addition, a single lens tested by different operators will generally also produce different readings.

It is therefor advantageous to provide an automatic means for testing these lenses to provide a rapid and efficient testing means compatable with modern mass production methods and eliminate the errors due to human judgement. Furthermore, automatic testing means are capable of testing such lenses with a substantially higher degree of accuracy than generally achieved by manual testing. This application deals with a system for automatically locating the optical center and optical axis of lenses while a copending application Ser. No. 583,576 filed for the same inventor, on the same day as the present application, and assigned to the assignee of the present application, discloses a method of automatically determining the focal power of lenses.

It is therefore an object of this invention to provide a new and improved automatic lens positioning control system.

It is also an object of this invention to provide a means for automatically locating the optical center of lenses and the like.

It is also an object of this invention to provide a means for automatically determining the optical axis of toric lenses.

It is still a further object of this invention to provide a means for automatically and accurately determining the optical center and optical axis of spheric and toric lenses.

A control system embodying the invention includes means for generating and directing a beam of radiation toward a radiation sensitive means, such as a phototube, that generates an electrical signal corresponding to the amount of radiation applied thereto. Attenuator means are mounted to intercept the beam for limiting the passage of the beam through a path that periodically alternates or switches about a reference axis. Servo means are coupled between the radiation sensitive means and the generating and directing means for moving said generating and directing means in a direction for automatically positioning the beam so that it is symmetrically located about the reference axis.

A further embodiment of the invention includes means for splitting the beam into two so that a portion of the beam is directed toward a second radiation sensitive means. Second attenuator means are mounted at an angle with respect to the other attenuator means to intercept the second beam to limit the passage of the beam through a path that periodically alternates or switches about a second reference axis. Servo means are coupled between the second radiation sensitive means and the generating and directing means for moving the generating and directing means along another direction for automatically positioning the second beam so that it is symmetrically located about the second reference axis. A lens having an unknown optical center may form a portion of the means for generating and directing the beam and is thereby positioned so that the optical center is automatically located at a predetermined point.

A still further embodiment of the invention includes means for splitting the beam into three beams, each being directed toward one of three radiation sensitive means with an attenuator means interrupting each beam to limit the passage of the respective beams through a path that periodically alternates about its respective central or reference axis. Servo means are coupled between the three radiation sensitive means and the generating and directing means so that the generating and directing means is moved and rotated in a manner that the beams are automatically symmetrically positioned about each reference axis. This embodiment is particularly adapted for automatically locating the optical center and the optical axis of lenses such as toric lenses by moving the means for directing and generating the beam so that the optical center of the lens is positioned at a predetermined point and the optical axis is rotated in alignment with a reference position.

The novel features which are considered to be characteristic of this invention are set forth with particularity in the appended claims. The invention itself, however, both as to its organization and method of operation as well as additional objects and advantages thereof will best be understood from the following description when read in connection with the accompanying drawings in which:

Figure 1:
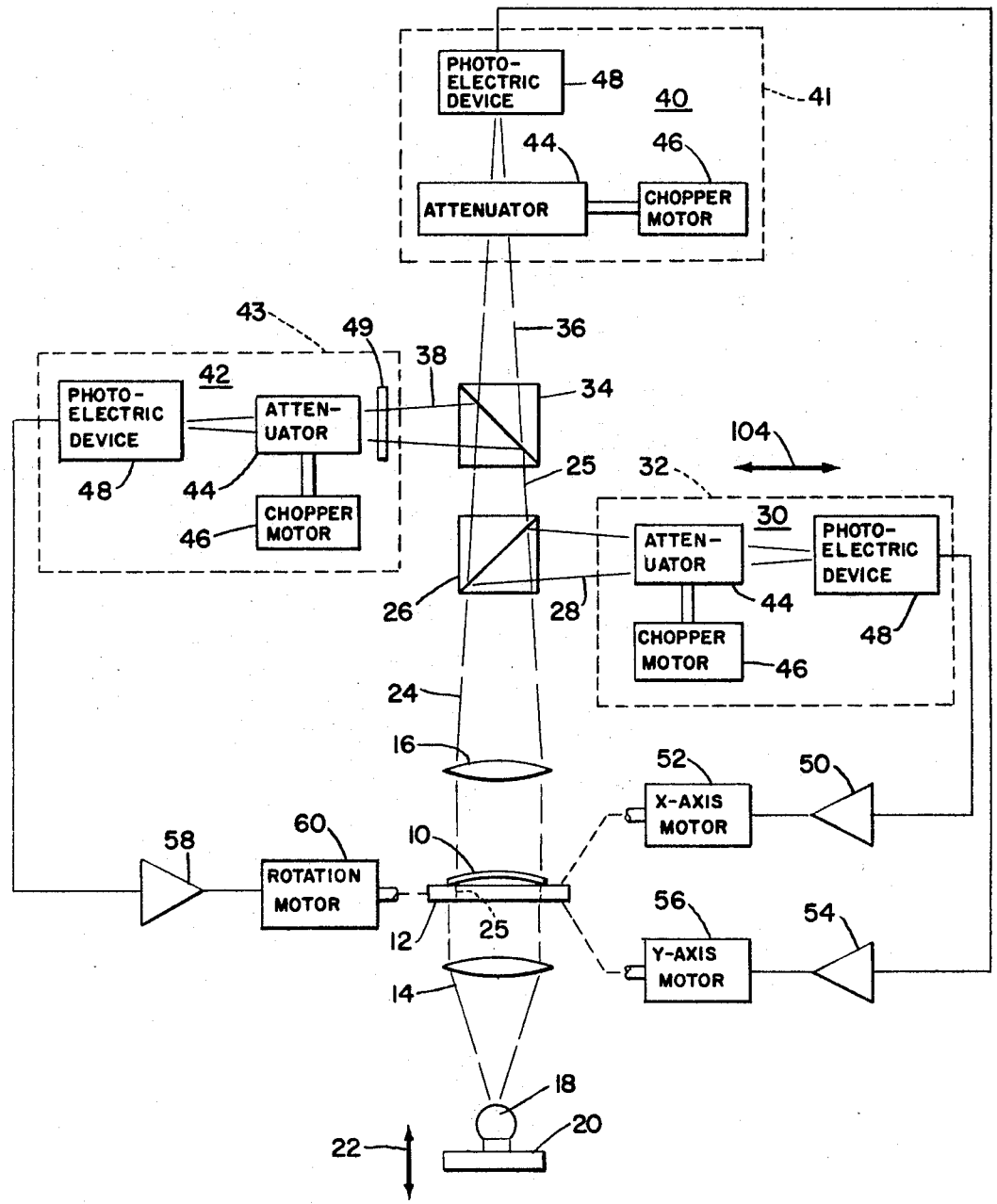
FIGURE 1 is a block diagram of a control system including the invention.
Figure 2:
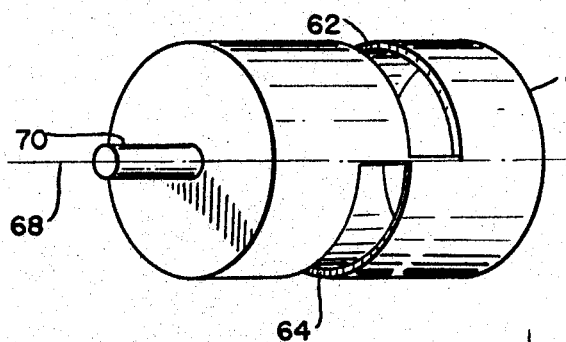
FIGURE 2 is a perspective view of a first embodiment of a radiation attenuator for the control system of FIGURE 1.

FIGURES 6A and B illustrate a balance position of various beams of radiation on the attenuator of FIGURE 2 while, FIGURE 6C is a schematic diagram illustrating interaction between the attenuator and the photoelectric device when the control system of FIGURE 1 is balanced.

FIGURES 7A and B illustrate an unbalance position of various beams of radiation on the attenuator of FIGURE 2, while FIGURE 7C is a schematic diagram illustrating the interaction between the attenuator and the photoelectric device when the control system of FIGURE 1 is unbalanced.

FIGURES 8A and B illustrates a second unbalanced position of various beams of radiation on the attenuator of FIGURE 2, while FIGURE 8C is a schematic diagram illustrating the interaction between the attenuator and the photoelectric device when the control system of FIGURE 1 is unbalanced in a direction opposite that of FIGURE 7.

FIGURE 9 is a graphic representation of the electrical signal generated by the photoelectric devices of FIGURE 1 that corresponds to the balanced condition of the control system of FIGURE 6.

FIGURE 10 is a graphic representation of an electrical signal generated by the photoelectric devices of FIGURE 1 when the system is unbalanced in a direction corresponding to FIGURE 7.

FIGURE 11 is a graphic representation of electrical signals generated by the photoelectric devices of FIGURE 1 when the control system is unbalanced in the direction illustrated in FIGURE 8.

FIGURE 12 is a second embodiment of a radiation attenuator for the control system of FIGURE 1.

FIGURE 13 is a third embodiment of a radiation attenuator for the control system of FIGURE 1.

The control system of FIGURE 1 illustrates an apparatus for automatically locating the optical center and/or optical axis of a lens. An unknown lens 10 (to be tested) is suitably mounted on a movable and rotatable table 12 intermediate a range lens 14 and a collector lens 16. Radiation for the control system is supplied by a lamp 18 mounted on a suitable movable base that is adapted to move towards and away from the range lens 14 in the directions designated by the arrows 22. A beam of radiation 24 is transmitted through an opening 25 in the table 12 and the combination of lenses 10, 14 and 16 to a first conventional beam splitter 26.

A portion of the beam 24 is divided to form a beam 28 applied to a first detection system 30 (within the dashed block 32) and a beam 25 applied to a second conventional beam splitter 34. The second beam splitter 34 divides the beam into two separate beams 36 and 38 which are applied to the detecting systems 40 and 42 respectively (within the dashed blocks 41 and 43).

The detection systems 30 and 40 are portions of control loops for positioning the lens 10 so that its optical center is automatically positioned at a predetermined point. The detection system 42 is a portion of a control loop to rotate the lens 10 so that its optical axis is automatically aligned at a predetermined position.

Each of the detection systems 30, 40 and 42 includes a movable attenuator 4 receiving the respective beam of radiation, an attenuator motor 46 for driving the attenuator at a constant rate and a photoelectric device 48 receiving radiation passing through the attenuator. The detection system 42 additionally includes a mask 49 positioned to limit the amount of radiation received by its attenuator 44.

The photoelectric device 48 of the detection system 30 is coupled through an amplifier 50 to a motor 52 suitably coupled to the table 12 to form a first control loop for driving the table along a first predetermined path which can be designated as the X axis. The photoelectric device 48 of the detection system 40 is coupled through an amplifier 54 to a motor 56 which is suitably coupled to the movable table 12 to form a second control loop for driving the table along a second predetermined path which can be designated as the Y axis. The photoelectric device 48 of the detection system 42 is coupled through an amplifier 58 to a motor 60 which is suitably coupled to the movable table 24 for rotation thereof. The table 12 is mounted so that its movement in the X and Y axis and its rotation lie in a plane substantially normal to the beam 24.

The control loop including the beam splitter 34, the detection system 42, amplifier 58 and motor 60 can be eliminated if there is no necessity to locate an optical axis, such as in the case where only spheric lenses are to be tested.

Figure 4:
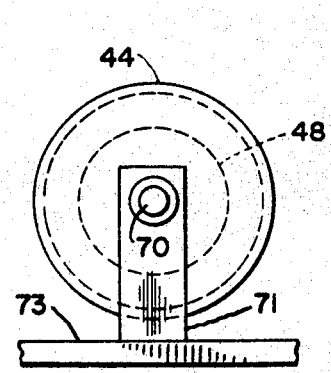
FIGURE 4 is a side view of the attenuator of FIGURE 3.
Figure 3:
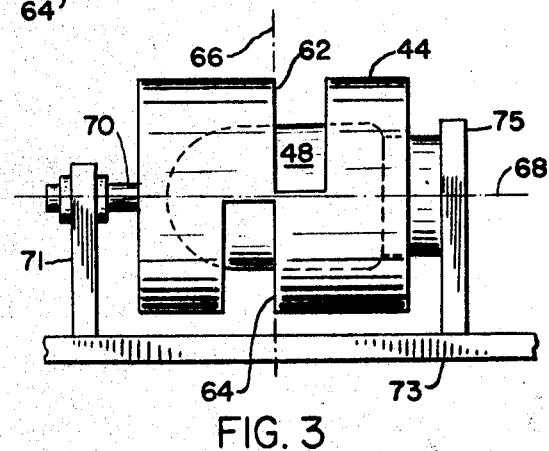
FIGURE 3 is a front view of the attenuator of FIGURE 2 including a radiation sensitive device.

Referring now to FIGURES 2, 3, and 4, an embodiment of the attenuators 44 of FIGURE 1 is illustrated having a generally hollow cylindrical shape with two equal elongated slots 62 and 64 formed so that inner edge of each slot lie substantially in the same plane that is perpendicular to the axis 68 of the cylindrical shell. The inner edges of the slots 62 and 64 form a reference line or axis 66 about which the beam is balanced as explained in a later portion of the specification. A shaft 70 is coupled to the attenuator 44 at the cylindrical axis 68 and is adapted to be connected to a motor for rotating the attenuator about its cylindrical axis.

When the attenuator of FIGURES 2, 3, and 4 is employed, the photoelectric device 48 is mounted within the hollow cylindrical attenuator as illustrated in FIGURES 3 and 4. As illustrated, the attenuator is bearing mounted in place by a bracket 71 mounted to a base 73 for easy rotation. The photoelectric device 48 is mounted on a bracket 75, connected to the base 73, to extend within the attenuator 44 so that the radiation received by the photoelectric device 48 is controlled by the position of the slots 62 and 64 with reference to the location of the beam applied thereto.

Figure 5:
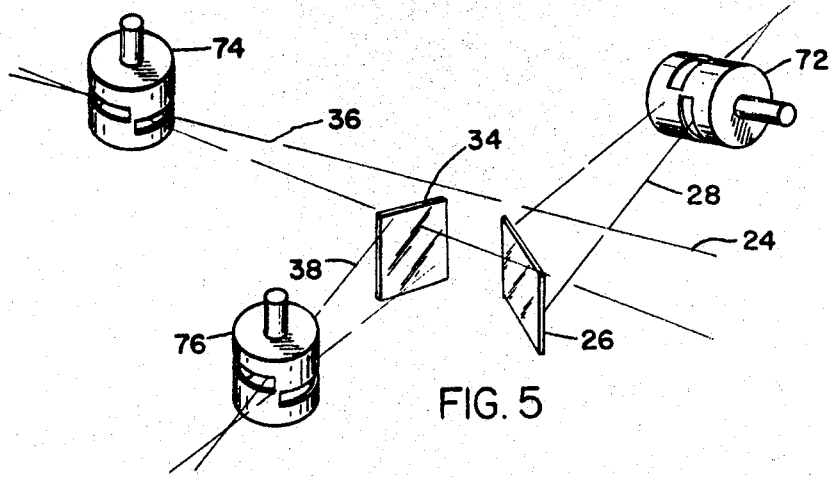
FIGURE 5 is a perspective diagram illustrating the physical relationships of the three attenuators of FIGURE 1.

Referring now to FIGURE 5, three attenuators 72, 74 and 76 of the type shown in FIGURES 2, 3 and 4 are illustrated corresponding to the attenuators of the detecting systems 30, 40 and 42 respectively. The beam 28 is received by the attenuator 72, the beam 36 is received by the attenuator 74 and the beam 38 received by the attenuator 76. The attenuators 72 and 74 are positioned to rotate planes normal to each other and also normal to the axis of the beams so that the location of the center of the respective beams can be photoelectrically detected and the signal translated into X–Y positional information of the lens 10. The attenuator 76 is illustrated as positioned in the same plane as attenuator 74, however, it is to be understood that the attenuator 76 can be placed in other planes such as that including the attenuator 72.

When a spheric lens is being tested, the combination of lenses 12, 14 and 16 function to focus the beams of radiation 28, 36 and 38 to a point so that the beams have a generally circular cross-section as illustrated in FIGURES 6A, 7A and 8A by the dashed circle 100. On the other hand, when a toric lens is tested, the beams 28, 36 and 38 come to a focus in the form of elongated bars as illustrated by the dashed bar 102 in FIGURES 6B, 7B and 8B.

Initially the control system of FIGURE 1 is set up by locating the focal point of the corresponding optical meridian on the respective photoelectric device in each control loop. This is accomplished by moving the source of radiation 18 in the direction of the arrows 22 until the beam is focused upon the photoelectric device in the detection systems 40 and 42, which are positioned at equal beam distances away from the source 18. If the control system of FIGURE 1 is limited to testing spheric lenses (in the manner as previously mentioned) the detion system 30 can also be positioned on equal beam distance away from the source 18 so that all the respective beams are simultaneously focused by moving the source 18. On the other hand, if a toric lens is to be tested, the focal point in the optical meridian of the detection system 30 (attenuator 72) is offset from that of the optical meridian of the detection systems 40 and 42 (attenuators 74 and 76) by an amount corresponding to the cylindrical power of the toric lens. Accordingly, the detection system 30 is mounted on a movable base and is adapted to move toward and away from the beam splitter 26 in the directions indicated by the arrows 104 for locating the focal point on its photoelectric device.

With the control system focused, the beams of radiations impinge upon the various attenuators as illustrated by the dashed circle 100 in the FIGURES 6A, 7A and 8A when the lens 10 is a spheric lens and as illustrated by the elongated bars 102 in the FIGURES 6B, 7B and 8B when the lens 10 is a toric lens. The radiation mask 49 in FIGURES 6B, 7B and 8B is only employed in the axis detection system 42 and is to be eliminated when referring to the interaction of the attenuator 44 and the photoelectric device 48 of the detection systems 30 and 40. The top edge 104 of the radiation mask 49 (as illustrated in the FIGURE 6B, 7B and 8B) is aligned with the axis of rotation of the attenuator 44 so that radiation only passes through the top half of the corresponding attenuator. The attenuator 44 of FIGURES 6C, 7C and 8C is cross-sectioned to illustrate the effect of the attenuator on the radiation received by the photoelectric device 48.

As illustrated in FIGURES 6A, B and C, the light beams 100 and 102 are symmetrically positioned about the reference axis 66 corresponding to the aligned edges of the slots 62 and 64 so that the amount of radiation received by the photoelectric device 48 through the slots 62 and 64 as the attenuator 44 is rotated is substantially equal. The photoelectric device 48 accordingly generates a signal having substantially no alternating current (A-C) component (as illustrated in FIGURE 9). In FIGURES 9-11, the current output of the photoelectric device 48 is plotted as a function of the rotation of the attenuator 44. For purposes of illustration it can be assumed that during the periods $T_1$-$T_2$ and $T_3$-$T_4$ the radiation enters through the slot 62 and during the periods $T_2$-$T_3$ and $T_4$-$T_5$, the radiation enters the slot 64.

When the beams 100 or 102 are not symmetrically positioned about the reference line 66 in a manner as illustrated in FIGURES 7A-C and 8A-C, the radiation passes to the photoelectric device through the slot 62 in FIGURES 7A, B and C and through the slot 64 in FIGURES 8A, B and C. With this degree of unbalance, the photoelectric devices 48 of FIGURES 7A, B and C and 8A, B and C receives radiation for only one half revolution of the attenuator. The FIGURE 10 corresponds to the electrical signal generated with the unbalanced condition of FIGURES 7A, B and C while FIGURE 11 corresponds to the electrical signal, generated for FIGURES 8A, B and C. As the unbalance decreases, (the beams move toward the reference axis 66) the beam passes through both slits per revolution but vary in amount until balanced. Accordingly, the photoelectric device 48 generates a electrical signal having an A-C component with a phase relation corresponding to the direction in which the beam in unbalanced and an amplitude related to the amount of unbalance.

If the attenuator is rotated at a 60 cycle rate and has a preset phase relation to the 60 cycle line mains, the signal generated by the photoelectric device 48 can be amplified by an amplifier 108 and applied to a split phase 60 cycle motor 109 in a conventional manner. As previously mentioned, the motors 52 and 56 are connected to move the table 12 along normal paths (designated as X and Y axis) in a plane normal to the axis of the beam 24. These two motors function to locate the optical center of the lens 10 at a predetermined point wherein the beams 100 or 102 are symmetrically positioned with respect to the reference axis 66. It should be noted, the beam 102 can be at any angular position with respect to the reference axis 66 of the attenuator 44 of the detection systems 30 and 40 and the corresponding X and Y axis control loop are still balanced.

In the optical axis control loop, the effect of the mask 49 prevents equal amounts of radiation from passing through both the slots 62 and 64 for each revolution unless the elongate beam or bar 102 is symmetrically aligned so that longer dimension of the beam is perpendicular or parallel to the reference axis 66. By placing the lens 10 on the table 12 so that the beam 102 is at a location other than substantially perpendicular to the reference axis 66, the control loop automatically rotates the table 12 to align the optical axis in a predetermined position so that the lens 10 axis may be conveniently marked.

In operation, the lens 10 need only be placed on the table 12, the source 18 adjusted to provide the required focus and the position of the detection system 30 adjusted in the case of toric lenses. The source 18 and the detection system 30 can be moved manually or automatically in a manner described in the copending application of the same inventor Ser. No. 583,567. The light attenuator effectively limits the passage of radiation to the photoelectric devices through a path that periodically alternates about the reference axis 66 by alternating or switching the slots 62 and 64 into the beam for each rotation of the attenuator 44. When the beam is symmetrically positioned about the reference axis 66 for the optical center control loops (X and Y axis), the optical center of the lens 10 is position at a predetermined point. When the elongated beam in the case of a toric lens is symmetrically positioned about the reference axis 66 with its elongated dimension substantially parallel to the reference axis, the optical axis of the lens 10 is automatically positioned along a predetermined line. With the lens so positioned, suitable means may be employed at the predetermined point and the predetermined line to mark the optical center and axis accordingly.

The second embodiment of an attenuator 44 illustrated in FIGURE 12 includes a polarized disc 120 having its optical axis designated by the arrow 122 and coupled to a shaft 124 for rotation thereof. Mounted adjacent the disc 120 and parallel thereto is a polarized plate 128 having a first polarized portion 130 with its optical axis designated by the arrow 132 and a second polarized portion 134 with its optical axis substantially normal to the optical axis 132 and designated by the arrow 136. The polarized disc 120 and plate 128 are mounted to intercept a beam of radiation 138 applied to a photoelectric device 48 in a manner so that the disc 120 and the plate 128 are in planes substantially normal to the axis of the beam 138. The abutting edges 140 of the polarized portions 130 and 134 are symmetrically aligned with the photoelectric device 48 and designate a reference line or axis about with the beam 138 is to be symmetrically balanced.

In operation, as the disc 120 rotates a passage for the beam 138 is alternatingly provided through the portions 130 and 134. For example, when the optical axis 122 is positioned as illustrated, a passage for the beam 138 is provided through the portion 134. When the disc 120 is rotated 90° from the position illustrated, the optical axis 122 and 132 are aligned and a passage is provided through the portion 130. By rotating the disc 120 at a constant rate, the passage for the beam 138 periodically alternates about the reference line 140 so that the attenuator provides the same effect as the attenuator of FIGURES 2, 3 and 4. A control loop including the attenuator of FIGURE 12 is balanced when the beam applied thereto is symmetrically positioned about the reference axis comprising the abutting edges 140 in the same manner as previously described with regards to FIGURES 1–11.

The third embodiment of an attenuator 44 is illustrated in FIGURE 13 including an opaque disc 150 coupled to a shaft 152 for the rotation thereof. The disc 150 includes two semicircular slots 154 and 156 formed therein, having equal widths, but being unequally displaced from the axis of the shaft 152. The radius of the outer edge 158 of the slot 154 is equal to the inner radius 160 of the slot 156. The attenuator of FIGURE 13 is mounted so that the radius 158 and 160 of the slots 154 and 156 is symmetrically positioned with respect to a photoelectric device and intercepts the beam so that a passage for the beam to the photoelectric device is periodically alternated through the slots 154 and 156. In effect, the radius including the curves 158 and 160 functions as a reference line or axis about which the beam is symmetrically positioned for balancing a control loop in a manner as previously described with regard to FIGURES 1–11.

What is claimed is:

1. The combination comprising:
   first and second radiation sensitive means for developing an electrical signal in response to radiation applied thereto;
   means for generating and directing a beam of radiation having an optical axis on said first and second radiation sensitive means;
   first and second attenuator means mounted transverse said beam of radiation directed on said first and second radiation means respectively, for periodically alternating a passage for said beams about separate reference axes;
   first control means coupled between said first radiation sensitive means and said means for generating and directing said beam for moving said generating and directing means along a predetermined path in a direction transverse said optical axis in response to the electrical signal developed by first radiation sensitive means, and
   second control means coupled between said second radiation sensitive device and said means for generating, directing said beam for moving said generating and directing means along another predetermined path in a direction transverse said optical axis in response to the electrical signal developed by said second radiation sensitive means whereby said generating and directing means is automatically positioned so that said beam of radiation is symmetrically located about said reference axes.

2. The combination comprising:
   first and second radiation sensitive means for developing an electrical signal in response to radiation applied thereto;
   a source of radiation;
   optical means including an optical axis for directing first and second beams of radiation toward said first and second radiation sensitive means respectively;
   first attenuator means mounted transversely of said first beam for periodically alternating a passage for said beam about a first reference axis thereby controlling the radiation received by said first radiation sensitive means;
   second attenuator means mounted transversely of said second beam for periodically alternating a passage for said beam about a second reference axis thereby controlling the radiation received by said second radiation sensitive means;
   first servo means coupled between said first radiation sensitive means and said optical means for moving at least a portion of said optical means along a predetermined path in a direction transverse said optical axis in response to the electrical signal developed by said first radiation sensitive device, and
   second servo means coupled between said second radiation sensitive means and said optical means for moving at least a portion of said optical means along another predetermined path in a direction transverse said optical axis whereby said first and second beams are symmetrically positioned about said first and second reference axes respectively.

3. The combination as defined in claim 2 wherein said first and second reference axis are located in normal planes.

4. The combination as defined in claim 3 wherein said first and second predetermined paths are normal to each other.

5. The combination as defined in claim 2 wherein said optical means comprises lens means for developing a converging beam of radiation and beam divider means for developing said first and second beams.

6. The combination as defined in claim 5 wherein:
   said first and second reference axes lie in normal planes;
   said first and second predetermined paths are substantially normal to each other, and
   said first and second servo means are coupled to said optical means so that said optical means is moved in a direction wherein said first and second beams are automatically symmertically positioned about said first and second reference axes.

7. The combination as defined in claim 2 wherein:
   said first and second attenuator means comprise a substantially cylindrical hollow chamber adapted to be rotated about its cylindrical axis and including two slots formed therein disposed on opposite sides of said chamber symmetrically located about a reference axis which is substantially perpendicular to said cylindrical axis.

8. A control system for automatically positioning a lens comprising:
   a source of radiation;
   optical means, including said lens, for developing a converging beam of radiation having an optical axis;
   attenuator means mounted to interrupt said beam for limiting the passage of said beam through a path that periodically alternates about a reference axis;
   radiation sensitive means mounted to receive the portion of said beam passing through said attenuator means and generating an electrical signal corresponding to the amount of radiation received, and
   servo means coupled between said lens and said radiation sensitive means for moving said lens along a path in a direction transverse said optical axis so that said beam is symmetrically positioned about said reference axis.

9. A control system for automatically aligning a lens having an optical axis and an optical center comprising:
   a source of radiation;
   optical means, including said lens, having an optical center and optical axis for developing a converging beam of radiation having an optical axis;
   means for splitting said beam into first, second and third beams;
   first, second and third attenuator means mounted to interrupt said first, second and third means respectively for limiting the passage of said beams through a path that periodically alternates about a reference axis in each of said first, second and third beams;

first, second and third radiation sensitive devices mounted to receive radiation passing through said first, second and third attenuator means respectively and generating an electrical signal corresponding to the amount of radiation received;

first, second and third servo means coupled between said first, second and third radiation sensitive means respectively and said lens for rotating said lens and moving said lens in a direction along paths transverse said beam optical axis so that said first, second and third beam of radiation is symmetrically positioned about its reference axis thereby locating the optical center of said lens at a predetermined point and aligning the optical axis of said lens in a predetermined position.

References Cited

UNITED STATES PATENTS

| | | | |
|---|---|---|---|
| 2,897,722 | 8/1959 | Gunter et al. | 88—56 |
| 2,968,994 | 1/1961 | Shurcliff | 88—56 X |
| 3,207,904 | 9/1965 | Heinz | 250—208 X |

JAMES W. LAWRENCE, *Primary examiner.*

C. R. CAMPBELL, *Assistant Examiner.*

U.S. Cl. X.R.

250—210, 232; 356—126

PO-1050
(5/69)

UNITED STATES PATENT OFFICE
CERTIFICATE OF CORRECTION

Patent No. 3,445,665    Dated May 20, 1969

Inventor(s) George J. Laughman

It is certified that error appears in the above-identified patent and that said Letters Patent are hereby corrected as shown below:

```
Col. 3, line 58, after "base" insert -- 20 --
Col. 4, line 4,  change "4" to -- 44 --
Col. 5, line 74, change "slits" to -- slots --
Col. 8, line 72, change "means" to -- beams --
```

SIGNED AND
SEALED

NOV 18 1969

(SEAL)
Attest:

Edward M. Fletcher, Jr.
Attesting Officer

WILLIAM E. SCHUYLER, JR.
Commissioner of Patents